Sept. 20, 1960    J. R. ALLEN ET AL    2,953,671
ELECTRIC DAIRY HEATING PAD
Filed Jan. 13, 1959    2 Sheets-Sheet 1

James R. Allen
Anna M. Allen
INVENTORS

Sept. 20, 1960   J. R. ALLEN ET AL   2,953,671
ELECTRIC DAIRY HEATING PAD
Filed Jan. 13, 1959   2 Sheets-Sheet 2
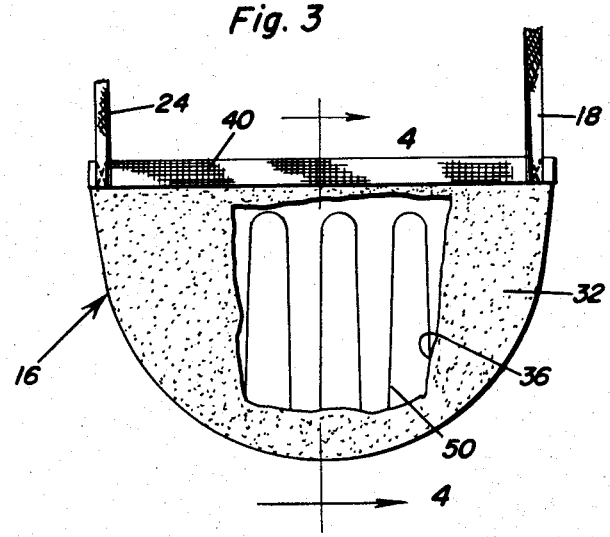
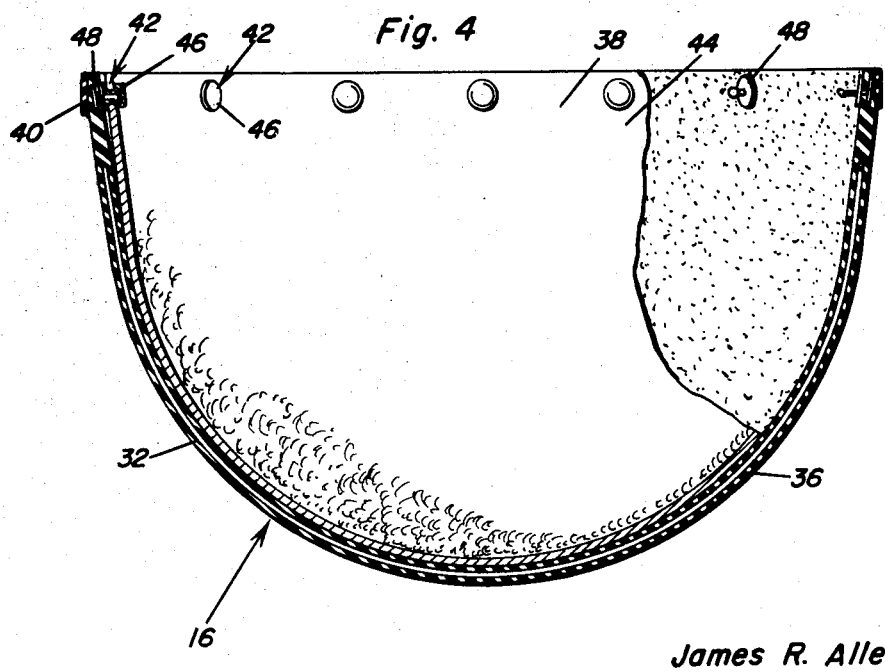
James R. Allen
Anna M. Allen
INVENTORS

2,953,671
ELECTRIC DAIRY HEATING PAD
James R. Allen and Anna M. Allen, both of Rte. 2, Clayton, Wis.

Filed Jan. 13, 1959, Ser. No. 786,499

3 Claims. (Cl. 219—46)

This invention relates to a heating device for the udders of cows.

An object of the invention is to provide a pad to relieve caked udders of milk cows before and after freshening and also to relieve discomforts of mastitis of the cows of a milk herd.

A further object of the invention is to provide a heating pad for the udder of a cow, the heating pad being sanitary and preferably electrically operative so that the heat generated in the pad may be very accurately controlled.

A further object of the invention is to provide a device for the udder of a milk cow, the device being constructed of a basket-shaped pad to fit over the udder and held in place by an adjustable harness. There is a removable liner of washable material in the pad so that the liner may be removed, cleansed and replaced with a minimum of difficulty.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a rear elevational view of a part of the attachment, parts being broken away to show details of the heating element.

Figure 4 is a cross-sectional view taken approximately on the line 4—4 of Figure 3 and on an enlarged scale.

Figure 1:
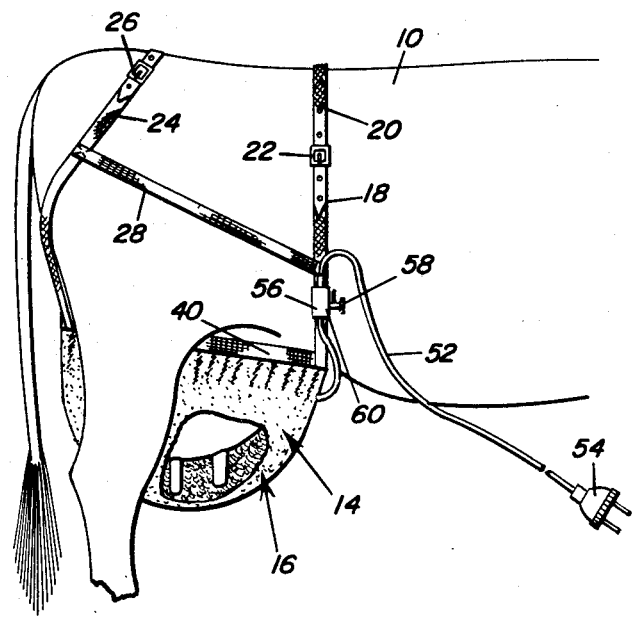
Figure 1 is a side elevational view of a part of a cow showing the attachment on the cow, with parts of the attachment broken away to illustrate otherwise obscure detail.

In the accompanying drawings a part of a cow 10 is shown in order to illustrate how attachment 14 is to be used. The attachment is constructed of a heating pad 16 held in place by an adjustable harness 18. The adjustable harness has a forward strap 20 with a buckle 22 or the like so that the effective length of the strap may be adjusted in accordance with the size of the cow 10. There is a rear strap 24 also having a buckle 26 or a like device for altering the effective length thereof. The rear strap (see Figure 2) is adapted to come together between the rear legs of the cow. The elastic side bands or straps 28 are attached to straps 18 and 24 on the sides of the cow to keep the straps from moving too far from each other.

Heating pad 16 is made of a flexible outer member 32. The flexible outer member may be rubber or a like non-electrically conductive substance so that heating elements 36 may be embedded therein between the inner and outer surfaces. As shown in Figure 4 heating pad 16 is molded or otherwise formed as a receptacle with an open upper end 38, and it has a band 40 around the open upper end portion of the outer panel 32. The band is bonded or otherwise fastened in place on the outer panel and has the extremities of both straps 18 and 24 fixed thereto, as by being stitched or otherwise fastened.

A plurality of conventional snap fasteners 42 are used to connect liner 44 on the inside surface of the outer panel 32. The liner is preferably made of a washable material, for example terry cloth or some other type of toweling. Liner 44 has the female parts 46 of snap fasteners 42 connected thereto, and the male parts 48 are molded or otherwise fastened to the outer panel 32. Accordingly, the liner 44 may be snapped in place and easily unsnapped for removal. The liner material is important since it must hold moisture for applications of wet heat as opposed to dry heat.

The heater 50 is composed of wire or other conventional type of heating elements 36 embedded in or otherwise connected to the outer panel 32. A lead wire 52 is connected at one end to the ends of heater 50, and has a plug 54 at the outer end to connect to a source of available electrical current. Rheostat 56 having a control element 58 is connected to the lead wire 52 intermediate its ends. It is preferred that the rheostat be housed in a receptacle 60 so that the receptacle may be secured to one of the straps, e.g. strap 18.

Figure 2:
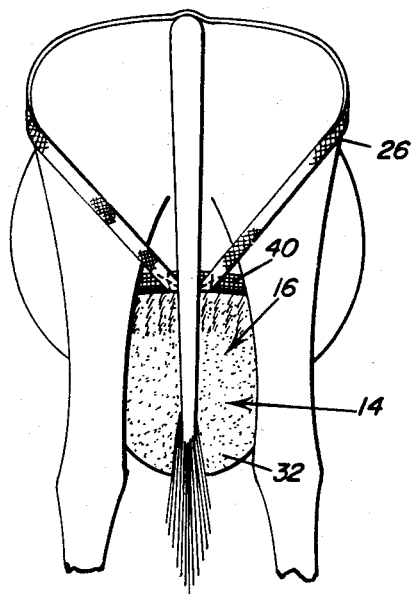
Figure 2 is a rear view of the cow and attachment of Figure 1.
Figure 5:
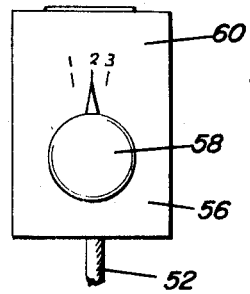
Figure 5 is an elevational view of a heat control rheostat used in the electrical system of the heater.

In use, the attachment 14 is applied to the cow as described and shown in Figures 1 and 2. The plug 54 is connected to a source of electrical current and the rheostat 56 adjusted for the desired heat within the heating pad. Liner 44 is not only a sanitary measure but also functions as a heat insulator preventing direct contact of any part of the cow udder with the outer panel 32. When soiled or periodically, the liner 44 is unsnapped and replaced with a clean liner. It is understood that when liner 44 is made of washable material, it may be reused. However, it is within the contemplation of the invention to use disposable liners made of a more inexpensive substance, for example absorbent paper.

The foregoing is considered as illustrative only of the principles of the invention. Further, since numerous modifications and changes will readily occur to those skilled the art, it is not desired to limit the invention to the exact construction and operation shown and described, and accordingly all suitable modifications and equivalents may be resorted to, falling within the scope of the invention as claimed.

What is claimed as new is as follows:

1. A heating appliance for cow udders, comprising in combination a bag-shaped udder receptacle formed from flexible rubber-like material and having an open top, an electric heating element embedded within said receptacle forming material, means for supplying electric current to said heating element, a liner of absorbent material removably positioned in said receptacle, a continuous marginal band secured to the upper edge of the receptacle, and a cow embracing harness including a set of straps secured at the ends thereof to said band, whereby to retain said receptacle in position.

2. The device as defined in claim 1 together with means for removably retaining said liner in said receptacle, said means comprising coacting separable fasteners provided on the upper edge portion of said receptacle and of said liner.

3. The device as defined in claim 1 wherein said liner is of a bag-shaped configuration conforming substantially to the configuration of said receptacle.

References Cited in the file of this patent

UNITED STATES PATENTS

| | | |
|---|---|---|
| 1,594,053 | Evans | July 27, 1926 |
| 1,851,107 | Moore et al. | Mar. 29, 1932 |
| 2,339,409 | Joy et al. | Jan. 18, 1944 |
| 2,625,643 | Cordis | Jan. 13, 1953 |
| 2,684,071 | Story | July 20, 1954 |
| 2,839,052 | Verch et al. | June 17, 1958 |